United States Patent
Martin et al.

(10) Patent No.: US 6,843,395 B1
(45) Date of Patent: Jan. 18, 2005

(54) DEER STAND AND GUN CARRIER

(76) Inventors: Kenneth W. Martin, 288 Marietta Rd., Mooresville, NC (US) 28117; E. Carl Martin, 288 Marietta Rd., Mooresville, NC (US) 28117

( * ) Notice: Subject to any disclaimer, the term of this patent is extended or adjusted under 35 U.S.C. 154(b) by 0 days.

(21) Appl. No.: 10/603,105

(22) Filed: Jun. 23, 2003

(51) Int. Cl.[7] ................................................. B60R 9/08
(52) U.S. Cl. ........................ 224/401; 224/536; 224/570; 224/913
(58) Field of Search ............................... 224/401, 408, 224/533, 534, 536, 567, 568, 570, 913; 280/769

(56) References Cited

U.S. PATENT DOCUMENTS

| | | | | |
|---|---|---|---|---|
| 5,595,333 A | * | 1/1997 | Boston | 224/536 |
| 5,676,257 A | * | 10/1997 | Adkins | 224/913 |
| 5,697,181 A | * | 12/1997 | Savant | 224/913 |
| 5,816,462 A | * | 10/1998 | Brantley | 224/570 |
| 5,878,929 A | * | 3/1999 | Leonard | 224/401 |
| 5,975,389 A | * | 11/1999 | Braun et al. | 224/913 |
| 6,142,349 A | * | 11/2000 | Roberson | 224/401 |
| 6,155,771 A | * | 12/2000 | Montz | 414/543 |
| 6,312,210 B1 | * | 11/2001 | Lang | 224/570 |
| 6,382,484 B1 | * | 5/2002 | Savant | 224/401 |
| 6,457,618 B1 | * | 10/2002 | Hancock et al. | 224/401 |
| 2002/0060232 A1 | * | 5/2002 | Stenger et al. | 224/401 |

* cited by examiner

*Primary Examiner*—Gary E. Elkins
(74) *Attorney, Agent, or Firm*—Adams Evans, P.A.

(57) ABSTRACT

A deer stand & gun carrier that includes structures for attaching guns and hunting stands and a bracket for securing the carrier to a carrying rack of an all terrain vehicle.

2 Claims, 2 Drawing Sheets

DEER STAND AND GUN CARRIER

TECHNICAL FIELD

The present invention relates to "All Terrain Vehicle" (hereinafter ATV) accessories and more particularly to a deer stand & gun carrier mountable to the carrying rack of an ATV that includes a rack assembly including three receiving tubes extending from a base tube in spaced parallel orientation, each receiving tube having a top opening at a top end thereof, two spaced posts extending from a sidewall thereof and a securing knob assembly having a threaded rod extending from a knob that is threadably engaged with an internally threaded aperture of a sidewall of each receiving tube adjacent the top opening; and an ATV rack attachment assembly for securing the rack assembly to a carrying rack of an ATV; the base tube including a securing knob assembly having a threaded rod extending from a knob that is threadably engaged with an internally threaded aperture of a sidewall of the base tube adjacent the side opening of the base tube.

BACKGROUND ART

The existing carrying rack of an ATV does not provide sufficient structures for carrying many hunting stands safely while also carrying a gun or guns. It would be desirable, therefore, to have a carrier for deer stands and guns that was configurable by a user to carry one or more hunting stands and/or guns that was attachable to the existing carrying rack of ATV to allow a hunter to safely transport guns and hunting stands using an ATV.

GENERAL SUMMARY DISCUSSION OF INVENTION

It is thus an object of the invention to provide a deer stand & gun carrier mountable to the carrying rack of an ATV that includes a rack assembly including three receiving tubes extending from a base tube in spaced parallel orientation, each receiving tube having a top opening at a top end thereof, two spaced posts extending from a sidewall thereof and a securing knob assembly having a threaded rod extending from a knob that is threadably engaged with an internally threaded aperture of a sidewall of each receiving tube adjacent the top opening; two adjustable holder assemblies each having an insertion tube having a first end insertable into a top opening of one of the three receiving tubes or a side opening of the base tube and a second end having a stand attachment bracket extending therefrom; and an ATV carrying rack attachment assembly for securing the rack assembly to a carrying rack of an ATV; the base tube including a securing knob assembly having a threaded rod extending from a knob that is threadably engaged with an internally threaded aperture of a sidewall of the base tube adjacent the side opening of the base tube.

Accordingly, a deer stand & gun carrier that is mountable to the carrying rack of an ATV is provided.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
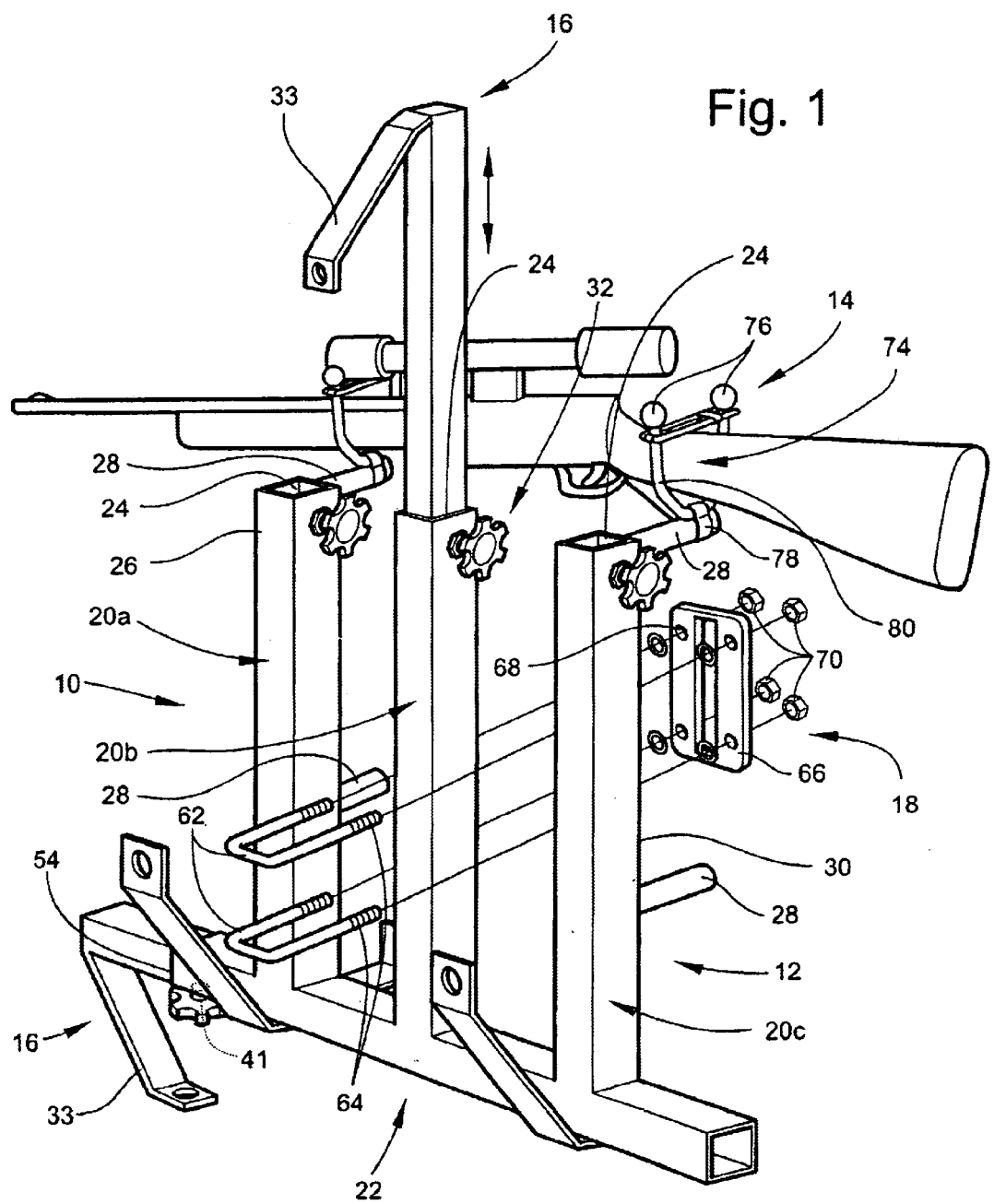
FIG. 1 is a perspective view of an exemplary embodiment of the deer stand & gun carrier of the present invention in a configuration with one holder assembly connected to the base tube and one holder assembly connected to one of the receiving tubes.
Figure 2:
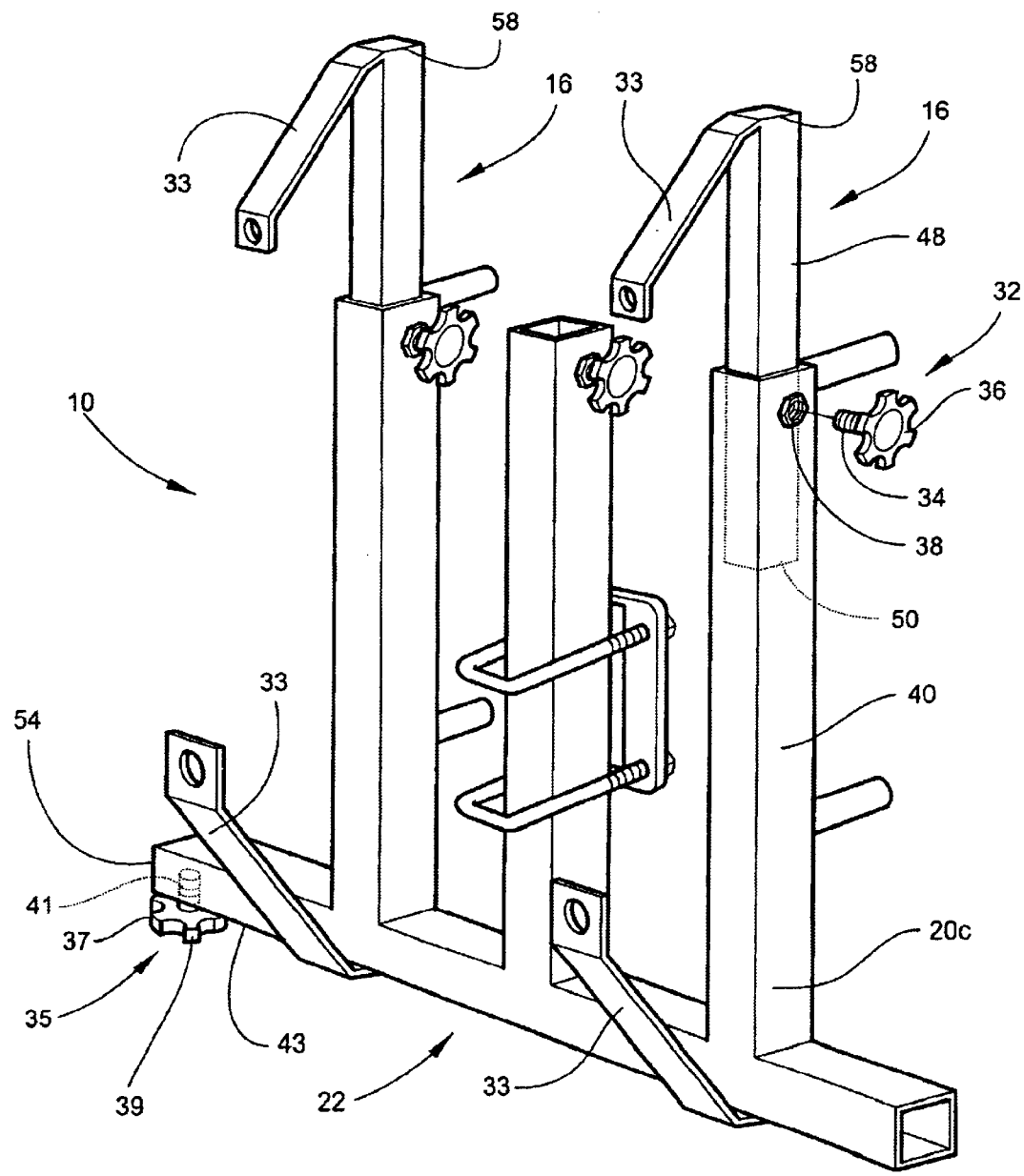
FIG. 2 is a perspective view of the deer stand & gun carrier of FIG. 1 in a configuration with each of the two holder assemblies connected to a receiving tube.

FIGS. 1 and 2 show various aspects of an exemplary embodiment of the deer stand & gun carrier of the present invention, generally designated 10. Deer stand & gun carrier 10 is mountable to the carrying rack of an ATV and includes a rack assembly, generally designated 12; four U-shaped gun holder assemblies, each generally designated 14; two adjustable holder assemblies, each generally designated 16; and an ATV carrying rack 18, attachment assembly, generally designated 18, for securing rack assembly 12 to a carrying rack of an ATV.

Rack assembly 12 includes three receiving tubes, generally designated 20a, 20b, 20c that extend from a base tube 22 in spaced parallel orientation. Each receiving tube 20a–c has a top opening 24 at a top end 26 thereof, two spaced posts 28 extending from a sidewall 30 thereof and a securing knob assembly, generally designated 32, having a threaded rod 34 extending from a knob 36 that is threadably engaged with an internally threaded aperture 38 of a sidewall 40 of each receiving tube 20a–c adjacent the top opening 24. Base tube 22 includes two stand attachment brackets 33 that extend therefrom in a direction opposite the direction of the posts 28 and a securing knob assembly, generally designated 35, having a threaded rod 37 extending from a knob 39 that is threadably engaged with an internally threaded aperture 41 (shown in dashed lines) of a sidewall 43 of base tube 22 adjacent a side opening 54 of base tube 22.

Each of the two adjustable holder assemblies 16 has an insertion tube, generally designated 48 that has a first end 50 (shown in dashed lines FIG. 2) that is insertable into a top opening 24 of one of the three receiving tubes 20a–c or the side opening 54 of base tube 22 and a second end 58 having a stand attachment bracket 33 extending therefrom.

ATV carrying rack attachment assembly 18 is used to attach rack assembly 12 to a carrying rack of an ATV and in this exemplary embodiment includes two U-bolts 62 each having two threaded ends 64, a mounting plate 66 that has four U-bolt end receiving apertures 68 therethrough, and four nuts 70 that are each adapted to thread onto a threaded end 64 of a U-bolt 62.

Each of the four U-shaped gun holder assemblies 14 has a U-shaped cradle member, generally designated 74, having two end tips 76; a post securing bracket 78 for securing a center section 80 of U-shaped cradle member 74 to a post 28 of a receiving tube 20a–c and a holder member 86 securable between the two end tips 76 of U-shaped cradle member 74.

It can be seen from the preceding description that a deer stand & gun carrier has been provided.

It is noted that the embodiment of the deer stand & gun carrier described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An improved deer stand carrier bracket mountable to a carrying rack of an all terrain vehicle (ATV) comprising:

a rack assembly including three receiving tubes extending from a base tube in spaced parallel orientation, each receiving tube having a top opening at a top end thereof and a securing knob assembly having a threaded rod, extending from a knob, threadably engaged with an internally threaded aperture of a sidewall of each receiving tube adjacent the top opening;

two adjustable holder assemblies each having an insertion tube having a first end insertable into a top opening of one of the three receiving tubes or a side opening of the base tube and a second end having a stand attachment bracket extending therefrom; and an ATV carrying rack attachment assembly for securing the rack assembly to a carrying rack of an ATV;

the base tube including a securing knob assembly having a threaded rod extending from a knob that is threadably engaged with an internally threaded aperture of a sidewall of the base tube adjacent the side opening of the base tube.

2. An improved deer stand carrier bracket mountable to a carrying rack of an all terrain vehicle (ATV) comprising:

a rack assembly including three receiving tubes extending from a base tube in spaced parallel orientation, each receiving tube having a top opening at a top end thereof, and a securing knob assembly having a threaded rod extending from a knob that is threadably engaged with an internally threaded aperture of a sidewall of each receiving tube adjacent the top opening; the rack assembly constructed in a manner to allow the rack assembly to be readily secured to a carrying rack of an ATV; two of the three receiving tubes having a post extending from a sidewall thereof; and two gun holder assemblies, one secured to each of the two posts extending from a sidewall of one of the two receiving tubes having a post extending from a sidewall thereof; each gun holder assembly being adapted to support and be secured in connection with a portion of a gun;

the base tube including a securing knob assembly having a threaded rod extending from a knob that is threadably engaged with an internally threaded aperture of a sidewall of the base tube adjacent the side opening of the base tube.

* * * * *